United States Patent
Okubo

(10) Patent No.: US 6,718,255 B1
(45) Date of Patent: Apr. 6, 2004

(54) METHOD AND SYSTEM FOR MATCHING ENGINE TORQUE TRANSITIONS BETWEEN CLOSED AND PARTIALLY CLOSED ACCELERATOR PEDAL POSITIONS

(75) Inventor: Carol Louise Okubo, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 40 days.

(21) Appl. No.: 10/264,725

(22) Filed: Oct. 4, 2002

(51) Int. Cl.[7] .................... G06F 19/00; F02D 11/10; B60K 41/04
(52) U.S. Cl. .................. 701/110; 123/399; 701/114; 701/102
(58) Field of Search ................... 701/110, 114, 701/102, 115, 93; 123/399, 361, 352; 477/109, 111; 180/197

(56) References Cited

U.S. PATENT DOCUMENTS

| | | | |
|---|---|---|---|
| 5,099,429 A | | 3/1992 | Onari et al. |
| 5,249,558 A | | 10/1993 | Imamura |
| 5,581,465 A | | 12/1996 | Adler et al. |
| 5,646,851 A | | 7/1997 | O'Connell et al. |
| 5,656,921 A | * | 8/1997 | Farrall .................. 322/40 |
| 5,703,410 A | * | 12/1997 | Maekawa ............. 290/40 C |
| 5,713,428 A | * | 2/1998 | Linden et al. ........... 180/179 |
| 6,078,860 A | | 6/2000 | Kerns |
| 6,119,063 A | | 9/2000 | Hieb et al. |
| 6,199,006 B1 | | 3/2001 | Weiss et al. |
| 6,371,081 B1 | | 4/2002 | Hawkins et al. |
| 6,520,889 B1 | * | 2/2003 | Hughes et al. ........... 477/111 |
| 6,547,697 B1 | * | 4/2003 | Taffin et al. ............ 477/109 |

FOREIGN PATENT DOCUMENTS

| | | | |
|---|---|---|---|
| EP | 0 393 930 A1 | * 10/1990 | ....... F02D/11/10 |
| EP | 1072778 A2 | 1/2001 | |

OTHER PUBLICATIONS

Co–pending patent application S/N 10/064,909 Entitled "Power–Based Idle Speed Control", filed Aug. 28, 2002 and invented by Carol Okubo, et al.

* cited by examiner

Primary Examiner—Hieu T. Vo

(57) ABSTRACT

A method and system for controlling an electronically controlled throttle of an internal combustion engine. Driver demanded torque, $\tau_{dd}$ is determined. From said determined driver demanded torque, the time rate of change $d(\tau_{dd})/dt$ in such determined driver demanded torque is determined. A control signal, $\tau$, to the electronically controlled throttle is provided, such provided control signal being a function of: a previously provided control signal to the electronically controlled throttle, $\tau_0$; an offset, $\Delta\tau$, of the previously provided control signal, $\tau_0$, from the determined driver demanded torque, $\tau_{dd}-\tau_0$; and the determined time rate of change $d(\tau_{dd})/dt$.

10 Claims, 9 Drawing Sheets

METHOD AND SYSTEM FOR MATCHING ENGINE TORQUE TRANSITIONS BETWEEN CLOSED AND PARTIALLY CLOSED ACCELERATOR PEDAL POSITIONS

TECHNICAL FIELD

This invention relates to internal combustion engine control systems and more particularly to control systems for engines having electronically controlled throttles.

BACKGROUND AND SUMMARY OF THE INVENTION

As is known in the art, control strategies for internal combustion engines have evolved from purely electromechanical strategies to increasingly more complex electronic or computer controlled strategies. Spark-ignited internal combustion engines have traditionally used airflow as the primary control parameter, controlled by a mechanical linkage between a throttle valve and an accelerator pedal. Fuel quantity and ignition timing, originally mechanically controlled, were migrated to electronic control to improve fuel economy, emissions, and overall engine performance. Electronic throttle control systems have been developed to further improve the authority of the engine controller resulting in even better engine performance.

Electronic throttle control replaces the traditional mechanical linkage between the accelerator pedal and the throttle valve with an "electronic" linkage through the engine or powertrain controller. Because of this electrical or electronic linkage, this type of strategy is often referred to as a "drive by wire" system. A sensor is used to determine the position of the accelerator pedal which is input to the controller. The controller determines the required airflow and sends a signal to a servo motor which controls the opening of the throttle valve. Control strategies which imitate the mechanical throttle system by controlling the opening of the throttle valve based primarily on the position of the accelerator pedal position are often referred to as pedal follower systems. However, the ability of the controller to adjust the throttle valve position independently of the accelerator pedal position offers a number of potential advantages in terms of emissions, fuel economy, and overall performance.

An engine control strategy typically has a number of operating modes, such as idle, cruise, engine speed limiting, dashpot, normal driving, etc. The various control modes may or may not use the same or similar primary control parameters. Furthermore, modes of operation often use different control strategies, which may include open loop and/or closed loop feedback/feedforward control strategies. Likewise, different strategies may utilize proportional, integral, and/or derivative control with control parameters tuned to particular applications or operating conditions.

To provide optimal driving comfort and robust control of the engine under varying conditions, it is desirable to provide smooth transitions between control modes. In particular, it is desirable to provide smooth or seamless transitions between idle control mode, where the accelerator pedal is not depressed, and a normal driving mode where the accelerator pedal is depressed. Torque-based ETC (electronic throttle control) systems typically schedule a throttle position based on the driver's accelerator pedal position by first mapping pedal position, along with variables such as engine speed and vehicle speed, to an equivalent torque request. This so-called driver demand torque is then used to schedule throttle plate position, air fuel ratio, spark ignition timing and any other torque-influencing actuators in use (e.g. CMCV, VCT) in an optimal fashion to deliver this torque to the drive-train. When the driver releases the accelerator pedal to the zero, or closed pedal, position, this part pedal control system relinquishes control to one or more controllers which aim to provide acceptable coast-down rates and idle speed control. Together, these are referred to as closed pedal control. When the driver tips back in to the accelerator pedal, a transition occurs between the active closed pedal control and the driver demand part pedal control.

The problem addressed by the current invention is the following: At the time the driver tips in from closed pedal, the mapped driver demand torque may not match the torque which the engine was producing at closed pedal, causing a step change in the torque to be delivered by the engine. In accordance with the present invention, a method is provided to determine a replacement for the driver demand torque such that the initial part pedal torque matches the torque at closed pedal and so that in a minimal amount of time the part pedal torque will match the output of a driver demand table.

In accordance with one feature of the invention, a method is provided for controlling an electronically controlled throttle of an internal combustion engine. The method includes determining driver demanded torque, $\tau_{dd}$. The time rate of change $d(\tau_{dd})/dt$ in such determined driver demanded torque is determined from determined driver demanded torque, $\tau_{dd}$. A control signal, $\tau$, to the electronically controlled throttle is provided, such control signal $\tau$ being a function of: a previously provided control signal to the electronically controlled throttle, $\tau_0$; an offset, $\Delta\tau$, of the previously provided control signal, $\tau_0$, from the determined driver demanded torque, $(\tau_{dd}-\tau_0)$; and the determined time rate of change $d(\tau_{dd})/dt$.

In one embodiment, torque is calculated such that the shape of the part pedal torque substantially tracks that of the driver demanded torque. In this embodiment, the control signal, $\tau$, is provided by summing the prior control signal, $\tau_o$, with a term $\tau'$, the term $\tau'$ being:

(A) relatively small (i.e., $0<\tau'<d(\tau_{dd})/dt$) when:
  (a) the sense of the determined time rate of change $d(\tau_{dd})/dt$ is positive; and
  (b) the control signal, $\tau$, is greater than the currently determined driver demanded torque $\tau_{dd}$;

(B) relatively small (i.e., $d(\tau_{dd})/dt<\tau'<0$) when:
  (a) the sense of the determined time rate of change $d(\tau_{dd})/dt$ is negative; and
  (b) the control signal, $\tau$, is less than the currently determined driver demanded torque $\tau_{dd}$;

(C) relatively large (i.e., $0<d(\tau_{dd})/dt<\tau'$) when:
  (a) the sense of the determined time rate of change $d(\tau_{dd})/dt$ is positive; and
  (b) the control signal, $\tau$, is less than the determined driver demanded torque $\tau_{dd}$; and (D) relatively large (i.e., $\tau'<d(\tau_{dd})/dt<0$) when:
  (a) the sense of the determined time rate of change $d(\tau_{dd})/dt$ is negative; and
  (b) the control signal, $\tau$, is greater than the determined driver demanded torque $\tau_{dd}$.

In a further embodiment, the term, $\tau'$, is provided by determining a factor, $\alpha$, such factor, $\alpha$, being a function of an offset, $\Delta\tau$, between the driver demand torque, $\tau_{dd}$, and the control signal, $\tau$, (i.e., $\Delta\tau=\tau_o-\tau_{dd}$), and the sense (i.e., sign or polarity) of the determined time rate of change $d(\tau_{dd})/dt$. The prior control signal, $\tau_o$, is summed with the product of the determined factor, $\alpha$, and $\Delta\tau_{dd}$ to produce the control signal, $\tau$. That is, $\tau=\tau_o+\alpha\Delta\tau_{dd}=\tau_o+\alpha d(\tau_{dd})/dt\,\Delta t$.

In one embodiment, $\alpha$ is $1+f(\Delta\tau)$ when the sense of the determined time rate of change $d(\tau_{dd})/dt$ is positive (i.e., an acceleration is being demanded) and where $\alpha$ is $1-f(\Delta\tau)$ when the sense of the determined time rate of change $d(\tau_{dd})/dt$ is negative (i.e., a deceleration is being demanded) and where:

$$f(\Delta\tau) = -M, \text{ when } (\Delta\tau) < -B$$
$$= +M \text{ when } (\Delta\tau) > +B; \text{ and}$$
$$= (M/B)(\Delta\tau) \text{ when } -B > (\Delta\tau) > +B;$$

where M and B are constants and the magnitude of M is less than or equal to 1 and B is greater than 0.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
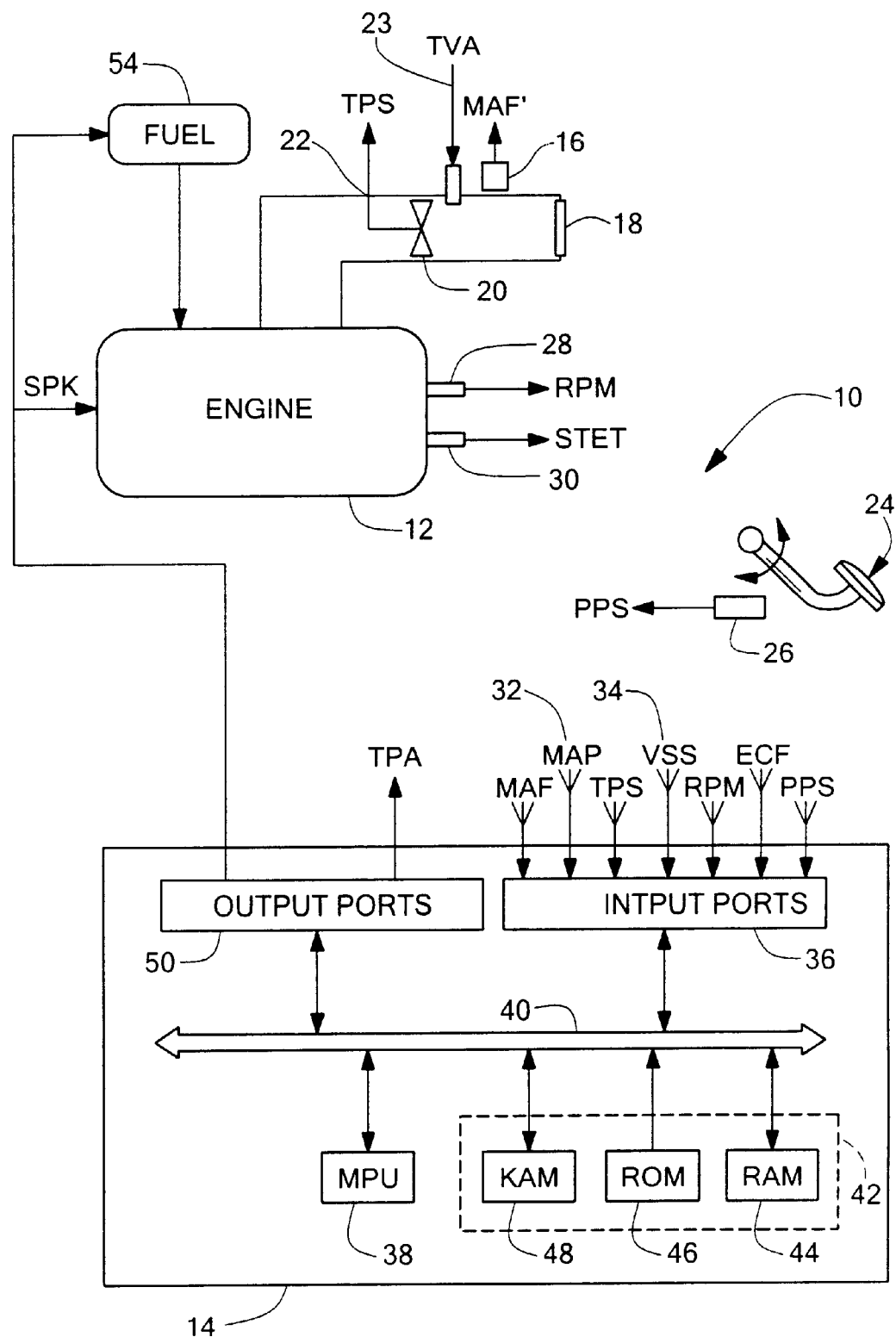
FIG. 1 is a diagram of an engine system according to the invention.

Referring now to FIG. 1, a block diagram illustrating operation of a system or method for providing smooth transitions between mode controllers according to the present invention. System 10 includes an internal combustion engine, indicated generally by reference numeral 12, in communication with a controller 14. Various sensors are provided to monitor engine operating conditions. Sensors may include a mass air flow sensor (MAF) 16 which monitors the air passing through intake 18. A throttle valve 20 regulates the air intake into engine 12 as well known in the art. A throttle position sensor (TPS) 22 provides an appropriate signal to controller 14 to monitor the throttle angle or position of throttle valve 20. An appropriate actuator such as a mechanical or electronic accelerator pedal 24 is used to determine the driver demand which, in turn, is used in the control of the position of throttle valve 20.

In a preferred embodiment, system 10 is an electronic throttle control system which uses a pedal position sensor (PPS) 26 to provide a signal indicative of the position of an accelerator pedal 24. Controller 14 uses the pedal position sensor signal, along with various other signals indicative of current engine operating conditions, to control the position of throttle valve 20 via an appropriate servo motor or other actuator 23. Such electronic throttle control or "drive-by-wire" systems are well known in the art.

Engine 12 may include various other sensors such as an engine speed sensor (RPM) 28, an engine temperature or coolant temperature sensor (TMP) 30 signal STET, a manifold absolute pressure (MAP) sensor 32, a vehicle speed sensor (VSS) 34, and the like.

Processor 14 receives signals from the various sensors via input ports 36 which may provide signal conditioning, conversion, and/or fault detection, as well known in the art. Input port 36 communicates with processor 38 via a data/control bus 40. Processor 14 implements control logic in the form of hardware and/or software instructions which may be stored in computer-readable media 42 to effect control of engine 12. Computer-readable media 42 may include various types of volatile and nonvolatile memory such as random-access memory (RAM) 44, read-only memory (ROM) 46, and keep-alive memory (KAM) 48. These "functional" classifications of memory may be implemented by one or more different physical devices such as PROMs, EPROMs, EEPROMs, flash memory, and the like, depending upon the particular application.

In a preferred embodiment, processor 38 executes instructions stored in computer-readable media 42 to carry out a method for controlling engine 12. The method provides a method for gradually transitioning between the torque at closed pedal and the driver demand torque at part pedal. From the standpoint of customer satisfaction, it is important that the modified torque reacts to the pedal position in the same manner, and at the same time, as the base driver demand torque, and that this torque quickly approaches the driver demanded torque. The goal is to modify the driver demanded torque so that the transition from closed pedal to part pedal is continuous so that the customer cannot perceive any change in the pedal position to torque map. For example, if the algorithm took a long time to return to the driver demanded table, then the driver may find that a given pedal position does not always provide the same vehicle response. As another example, if the resulting torque response exhibits a delay from the driver demand table then the driver will experience a "dead pedal" feeling in which a given amount of pedal travel appears to provide no acceleration from the vehicle.

The requirements for modifying the torque from the driver demand table may be stated more precisely:
 1. The new torque must initially equal the closed pedal torque.
 2. The new torque must approach the driver demand torque.

Figure 2:
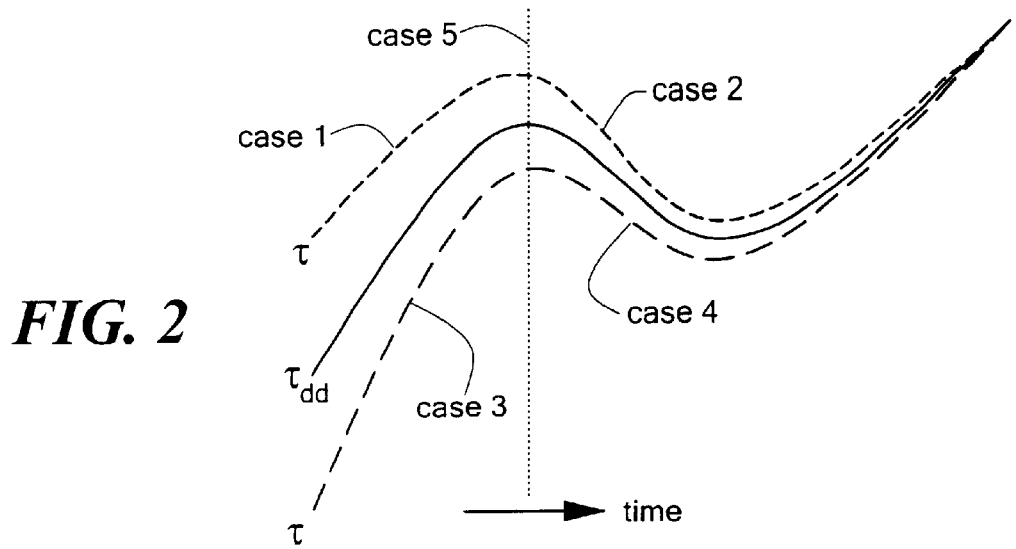
FIGS. 2 and 2A are diagrams useful in understanding the invention.
Figure 2A:
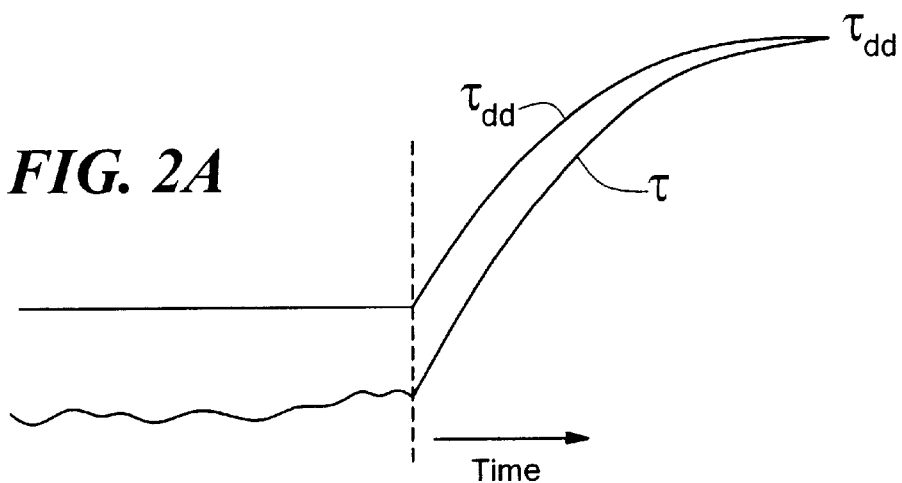

The slope of the new torque curve must always have the same sign as the driver demand torque curve. Let $\tau$ represent the control signal which will be provided to the ETC in place of the driver demand torque and let $\tau_{dd}$ represent the driver demand torque. The approach that will be taken is to define $\tau$ using the slope of the driver demand torque curve in such a way that the slope of the two curves always have the same sign, and so that the new curve approaches the driver demand torque, as shown in FIG. 2A. It is possible that the closed pedal torque may be either larger or smaller than the driver demand torque, so there are five possible cases (reference being made to FIG. 2):

1. $\tau > \tau_{dd}$ and $\frac{d\tau_{dd}}{dt} > 0$: In this case the slope of the new torque curve will be positive, but smaller in value than the driver demand curve, i.e. the curve will be flatter.

2. $\tau > \tau_{dd}$ and $\frac{d\tau_{dd}}{dt} < 0$: In this case the slope of the new torque curve will be negative, but larger in value than the driver demand curve, i.e. the curve will be steeper.

3. $\tau < \tau_{dd}$ and $\frac{d\tau_{dd}}{dt} > 0$: In this case the slope of the new torque curve will be positive, but larger in value than the driver demand curve, i.e. the curve will be steeper.

4. $\tau < \tau_{dd}$ and $\frac{d\tau_{dd}}{dt} < 0$: In this case the slope of the new torque curve will be negative, but smaller in value than the driver demand curve, i.e. the curve will be flatter.

5. $\frac{d\tau_{dd}}{dt} = 0$: In this case the slope of the new curve must also be zero regardless of whether the torque is larger or smaller than the driver demand torque.

Figure 3:
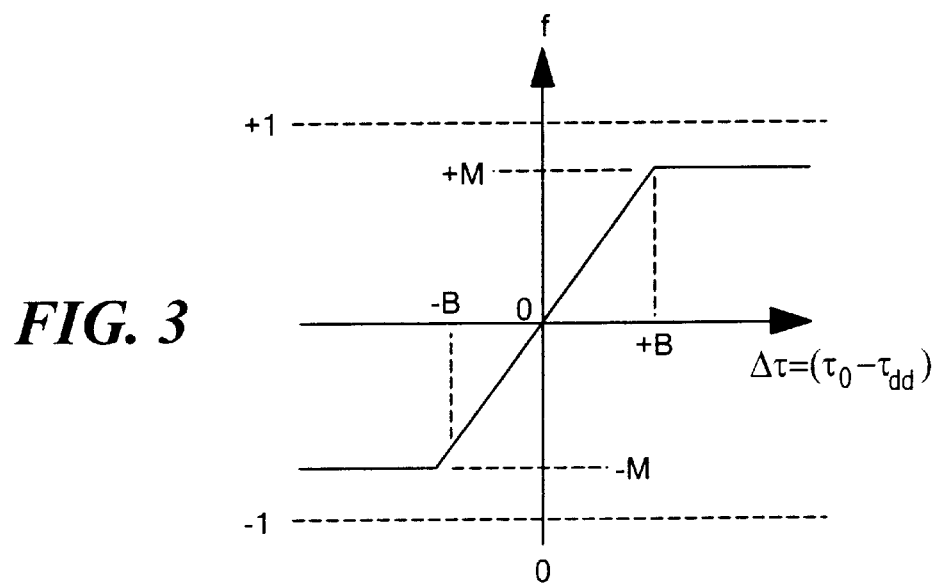
FIG. 3 is a curve of a function f as a function of a difference between a torque control signal $\tau$ produced in accordance with the invention and driver demanded torque.

It may be shown that the following construction will satisfy all of these requirements. Set $$\tau = \tau_o + \alpha \frac{d\tau_{dd}}{dt} \Delta t$$

with $$\alpha = 1 + \text{sgn}\left\{\frac{d\tau_{dd}}{dt}\right\} \cdot f(\Delta\tau)$$

where: $\tau_0$ is the prior control signal, $\Delta\tau = \tau_{dd} - \tau_0$ is the difference, or offset, between the prior-control signal $\tau_0$, and the prior driver demand torque, and the increasing function $f$ must lie between −minus one and one and $f(0)$ must be zero. An example of such a function, $f$, is shown in FIG. 3

Figure 3A:
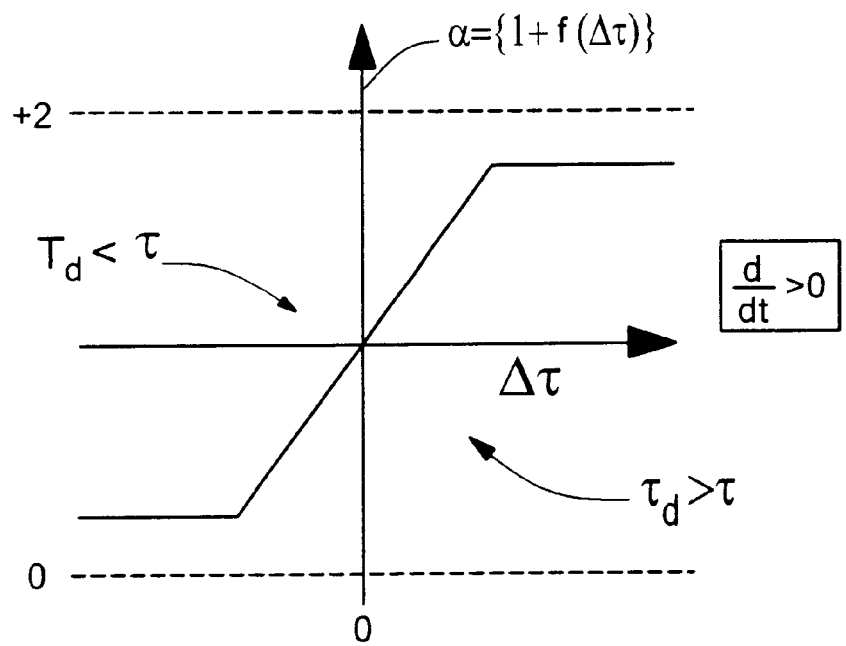
FIG. 3A shows a factor $\alpha$ as a function of the difference between a torque control signal $\tau$ used by the invention when acceleration is being demanded.
Figure 3B:
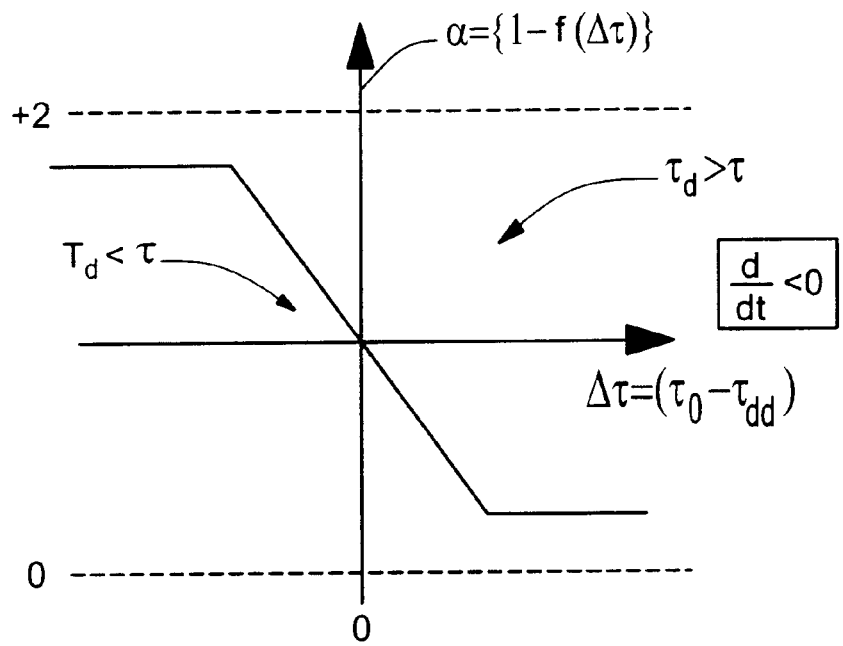
FIG. 3B shows a factor $\alpha$ as a function of the difference between a torque control signal $\tau$ used by the invention when a deceleration is being demanded.
Figure 4B:
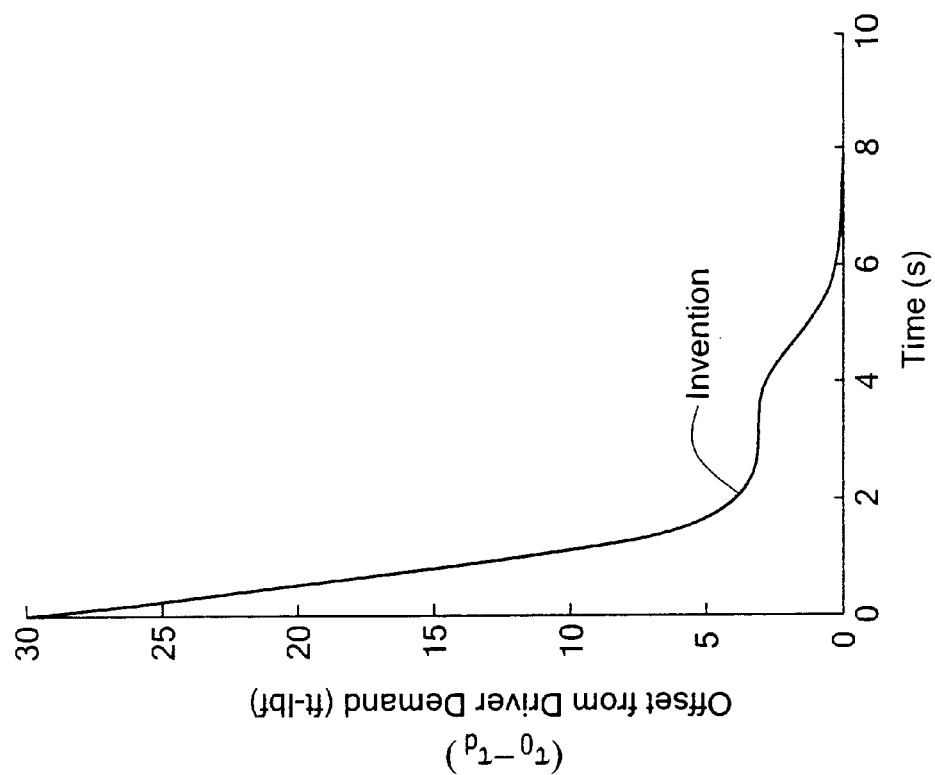
FIG. 4B is a curve showing the difference between the torque produced by the invention and demanded torque for the conditions used in FIG. 4A.
Figure 4A:
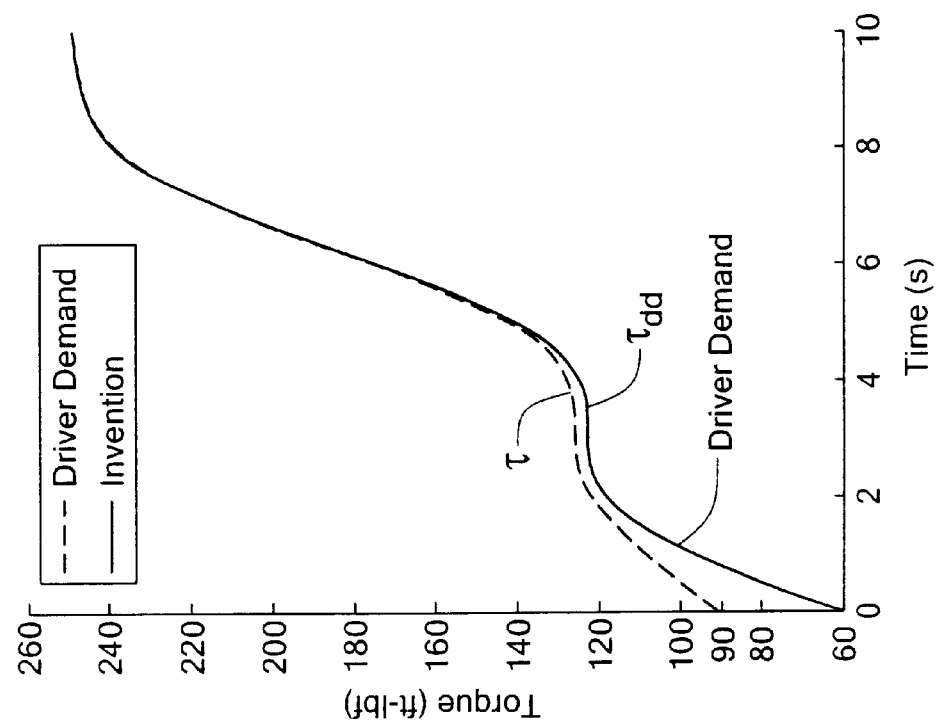
FIG. 4A is a curve showing torque produced in accordance with the invention and en exemplary demanded torque.

Given any such function $f$, $\alpha$ will always be positive, as shown in FIG. 3A for the case where there is an acceleration demand, and in FIG. 3B for the case where there is a deceleration demand, so the slopes of $\tau$ and $\tau_{dd}$ will always have the same sign. Further, in cases 1 and 4 (FIG. 2) the curves will be flatter, and in cases 2 and 3 they will be steeper. Referring to FIGS. 4A and 4B, the effect of changing the shape of the function $f$ on the convergence of the modified torque to the driver demand torque is demonstrated.

Figure 5:
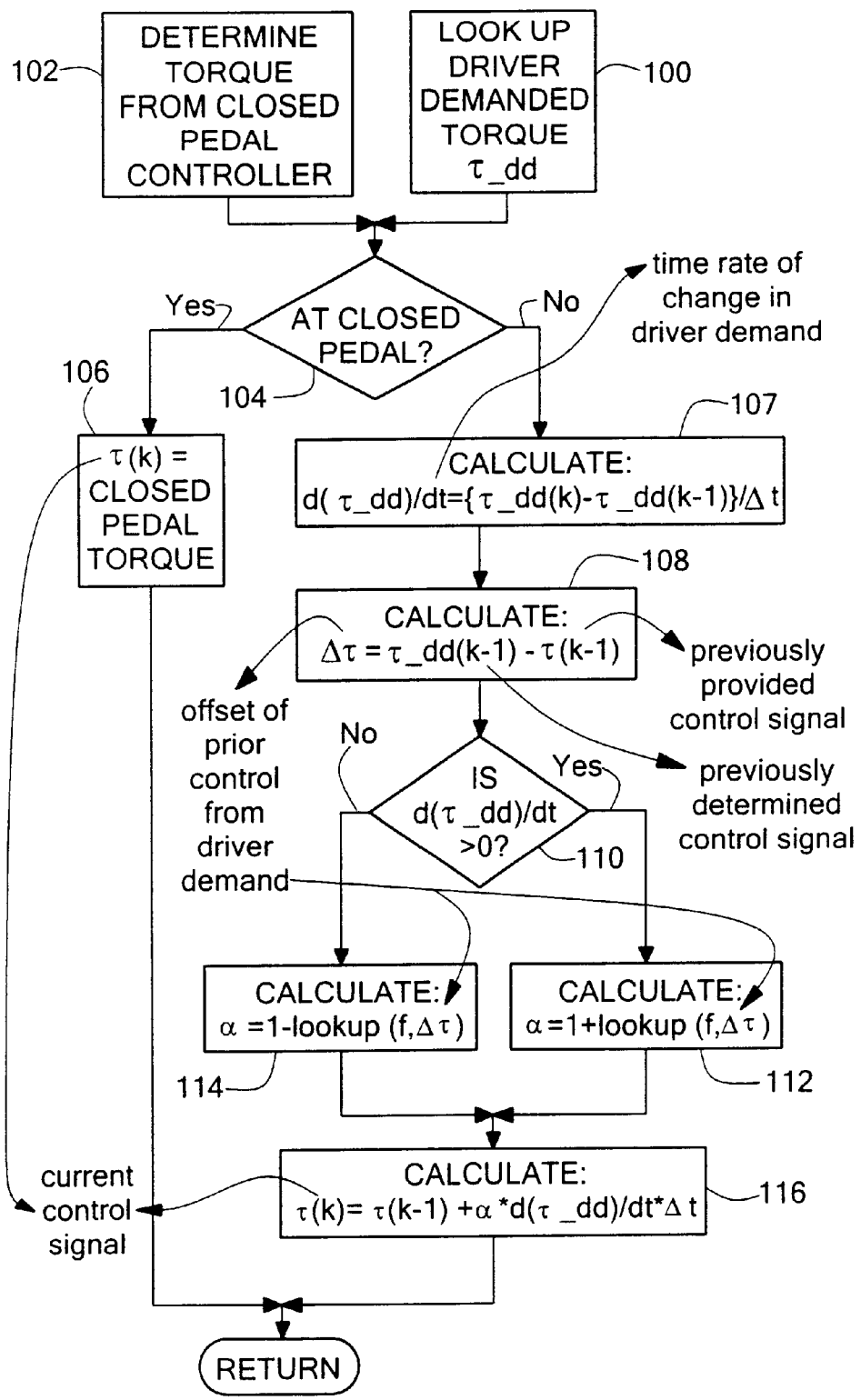
FIG. 5 is a flow diagram of a process used to control an electronically controlled throttle used in the engine of FIG. 1 in accordance with the invention.

The flow diagram of a program stored in the media 42 and executed by the controller 14 is shown in FIG. 5. The method includes periodically determining driver demanded torque, $\tau_{dd}(k)$, where k is the kth determined sample of the driver demanded torque; determining, from said periodically determined driver demanded torque, $\tau_{dd}$ as a function of accelerator pedal position and engine operating conditions, Step 100. A determination is also made as to torque demand from a closed accelerator pedal position under such engine operating conditions, Step 102. If the accelerator pedal is closed (i.e., the operator is demanding no engine torque), Step 104, the control signal provided to the electronically controlled throttle is the closed pedal torque, $\tau(k)$, Step 106. If, however, in Step 104, the demanded torque is not from a closed accelerator pedal position, a calculation is made of the time rate of change $d(\tau_{dd})/dt$ in such periodically determined driver demanded torque $(d\tau_{dd}/dt) = \{\tau_{dd}(k) - \tau_{dd}(k-1)\}/\Delta t$, where $\Delta t$ is the time interval samples of demanded torque, Step 107.

In Step 108, the difference, or offset, $\Delta\tau$, between the previous control signal, $\tau_0 = \tau(k-1)$, and the previous driver demanded torque, $\tau_{dd}(k-1)$ is calculated: $\Delta\tau = \tau_{dd}(k-1) - \tau(k-1)$. A determination is made as to whether the sense of the determined time rate of change $d(\tau_{dd})/dt$ is positive or negative (i.e., whether the demand is to accelerate or decelerate), Step 110. In either case a factor $\alpha$, is determined. If the sense of the determined time rate of change $d(\tau_{dd})/dt$ is positive, $\alpha$ is $1+f(\Delta\tau)$, Step 112, and $\alpha$ is $1-f(\Delta\tau)$ when the sense of the determined time rate of change $d(\tau_{dd})/dt$ is negative, Step 114.

In either case $$f(\Delta\tau) = -M, \quad \text{when } (\Delta\tau) < -B$$
$$= +M \text{ when } (\Delta\tau) > +B; \text{ and}$$
$$= (M/B)(\Delta\tau) \text{ when } -B > (\Delta\tau) > +B;$$

where M (the maximum magnitude of $f(\Delta\tau)$) and B (the breakpoint in $f(\Delta\tau)$) as shown in FIG. 3. It is noted that M and B are constants and the magnitude of M is less than or equal to 1 and B is greater than zero.

In Step 116, the control signal to the electronically controlled throttle, is calculated as $\tau(k) = \tau(k-1) + \alpha * d(\tau_{dd})/dt * \Delta t$.

Figure 6A:
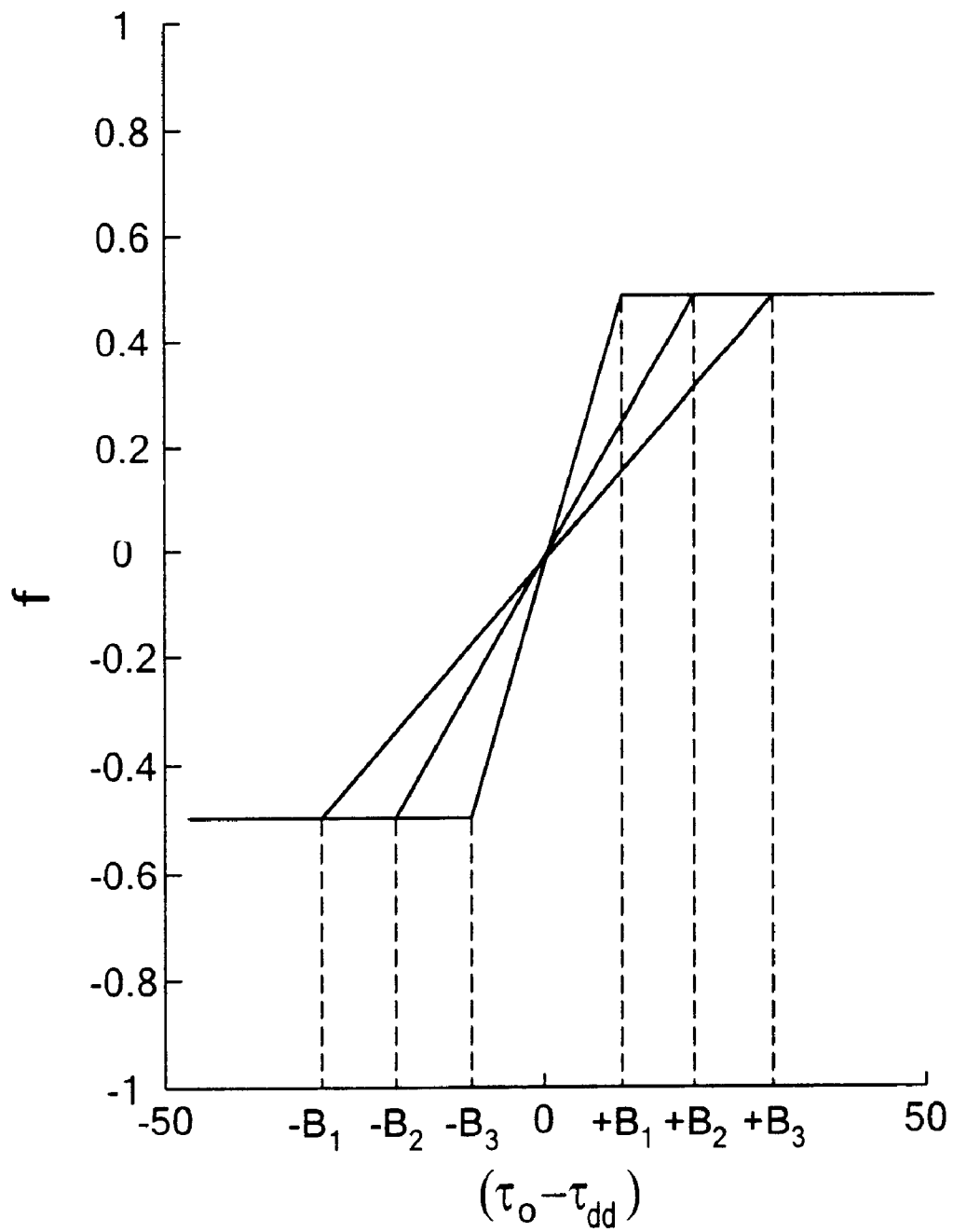
FIGS. 6A and 6B are curves showing the effect of variations in the factor $\alpha$ on engine torque produced in accordance with the invention for an exemplary driver demanded torque.
Figure 6B:
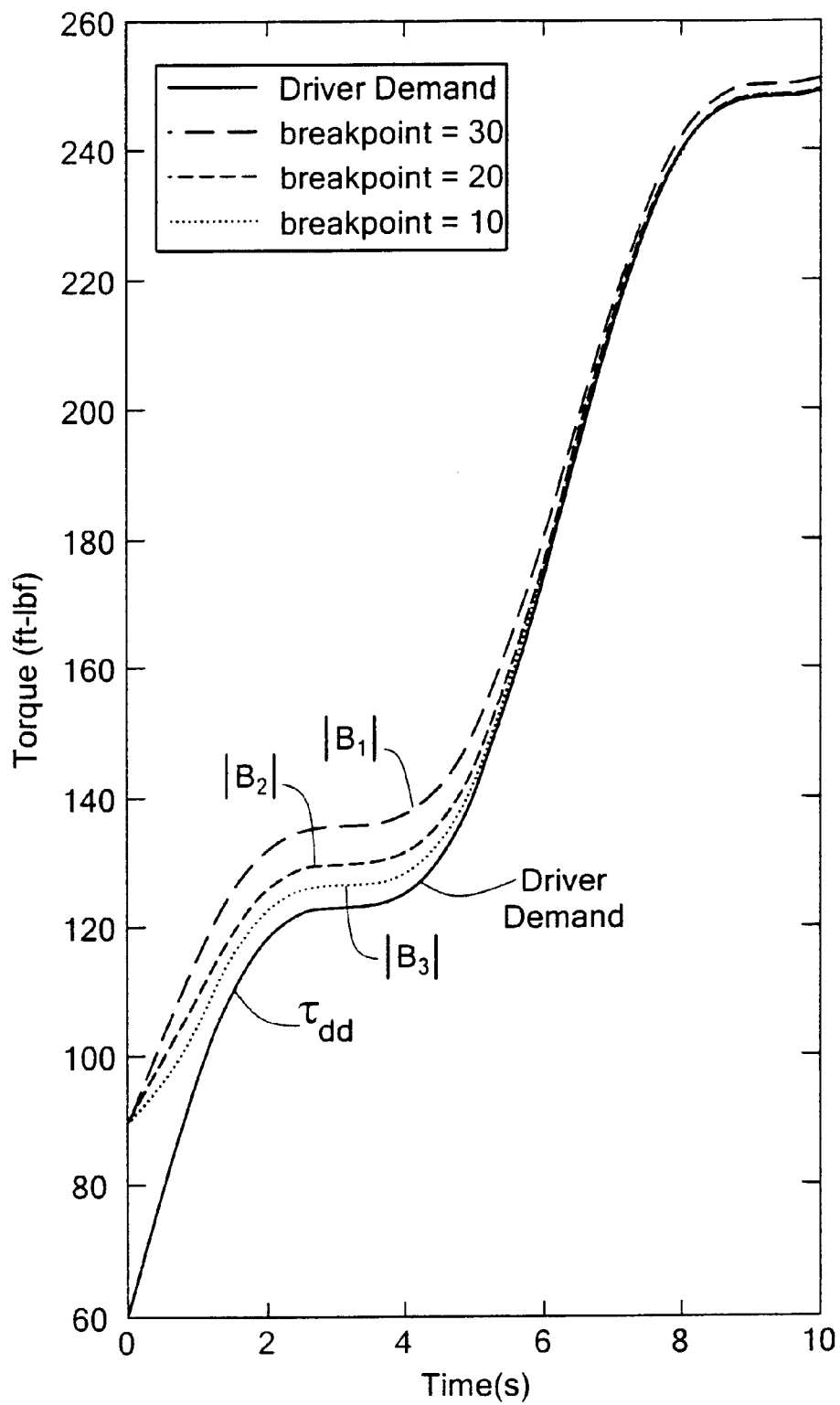
Figure 7A:
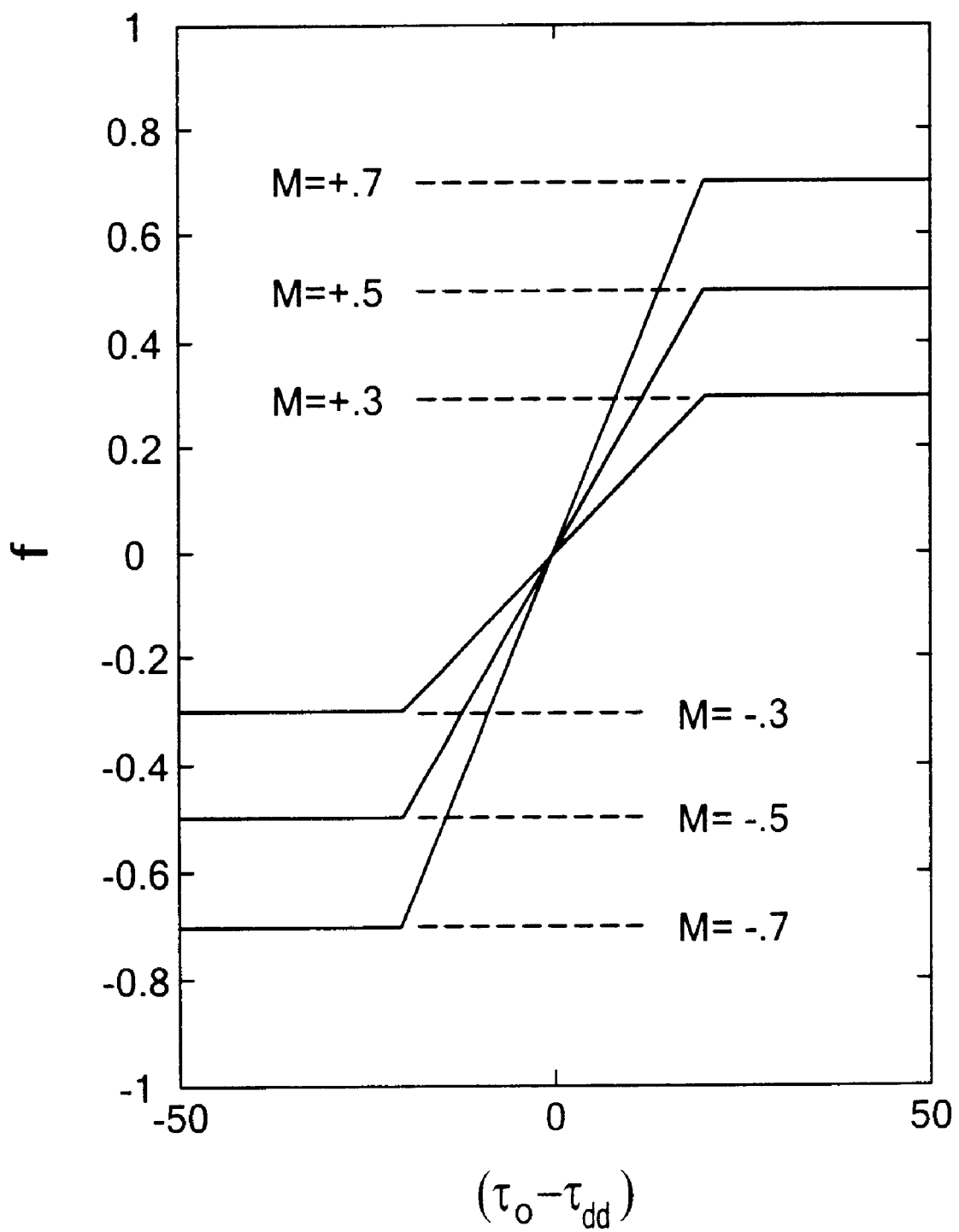
FIGS. 7A and 7B are curves showing the effect of variations in the factor $\alpha$ on engine torque produced in accordance with the invention for an exemplary driver demanded torque.
Figure 7B:
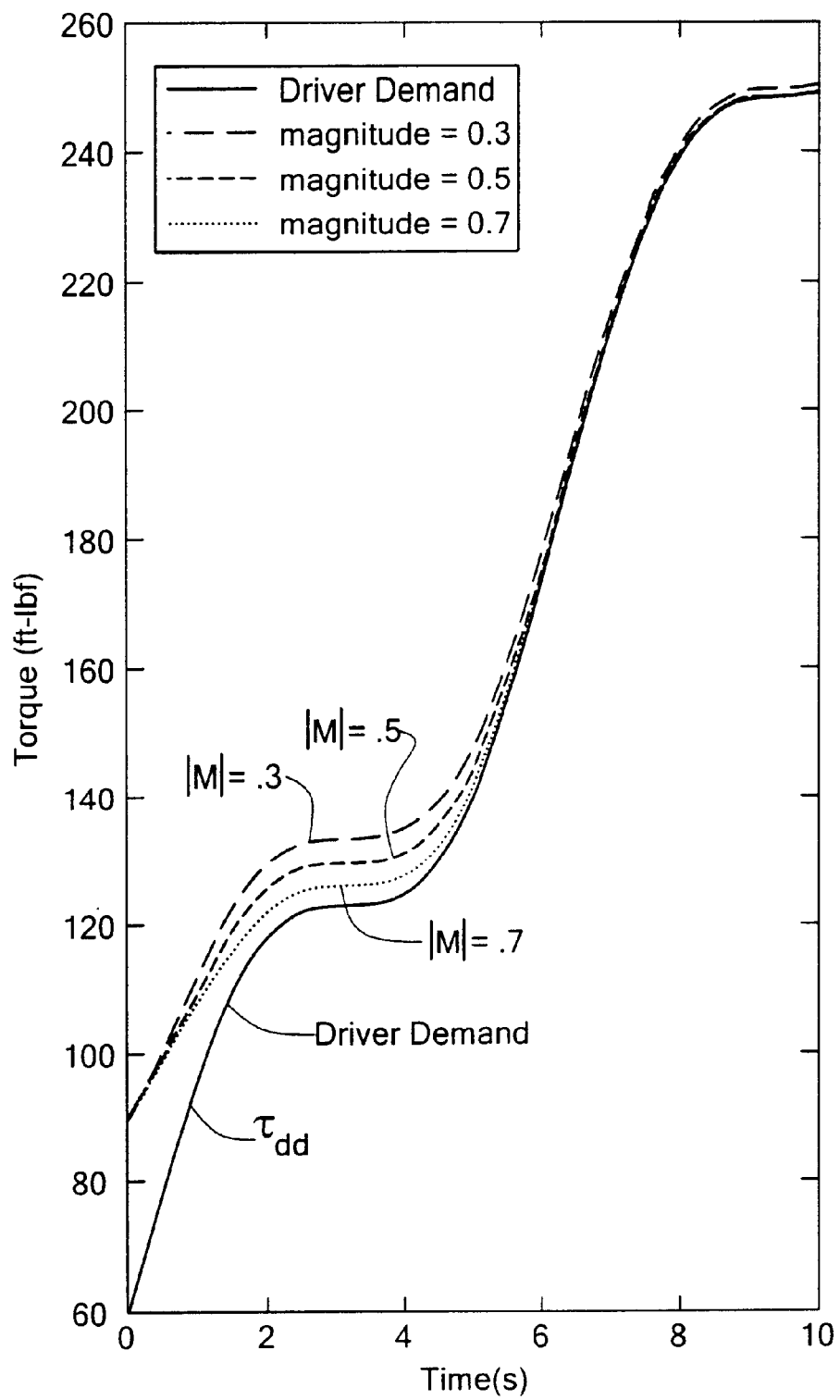

Referring now to FIGS. 6A and 6B, the effect of various breakpoints B is shown for an exemplary driver demand. Referring now to FIGS. 7A and 7B the effect of various maximum magnitudes M is shown for an exemplary driver demand.

A number of embodiments of the invention have been described. Nevertheless, it will be understood that various modifications may be made without departing from the spirit and scope of the invention. Accordingly, other embodiments are within the scope of the following claims.

What is claimed is:

1. A method for controlling an electronically controlled throttle of an internal combustion engine, comprising:
   determining driver demanded torque, $\tau_{dd}$;
   determining, from said determined driver demanded torque, the time rate of change $d(\tau_{dd})/dt$ in such determined driver demanded torque; and
   providing a control signal, $\tau$, to the electronically controlled throttle, such provided control signal being a function of: a previously provided control signal to the electronically controlled throttle, $\tau_0$; an offset, $\Delta\tau$, of the previously provided control signal, $\tau_0$, from the determined driver demanded torque, $\tau_{dd} - \tau_0$; and the determined time rate of change $d(\tau_{dd})/dt$).

2. The method recited in claim 1 wherein providing the control signal, $\tau$, comprises:
   combining driver demanded torque $\tau_{dd}$ with a term $\tau'$, the term $\tau'$ being:
   (A) relatively small when:
      (a) the sense of the determined time rate of change $d(\tau_{dd})/dt$ is positive; and
      (b) the control signal, $\tau$, is greater than the determined driver demanded torque $\tau_{dd}$;
   (B) relatively small when:
      (a) the sense of the determined time rate of change $d(\tau_{dd})/dt$ is negative; and
      (b) the control signal, $\tau$, is less than the determined driver demanded torque $\tau_{dd}$;
   (C) relatively large when:
      (a) the sense of the determined time rate of change $d(\tau_{dd})/dt$ is positive; and
      (b) the control signal, $\tau$, is greater than the determined driver demanded torque $\tau_{dd}$; and
   (D) relatively large when:
      (a) the sense of the determined time rate of change $d(\tau_{dd})/dt$ is negative; and
      (b) the control signal, $\tau$, is greater than the determined driver demanded torque $\tau_{dd}$.

3. The method recited in claim 1 wherein providing the control signal, $\tau$, comprises:
   determining a factor, $\alpha$, such factor being a function the offset, $\Delta\tau$, and the sense of the determined time rate of change $d(\tau_{dd})/dt$; and
   summing the previously provided control signal, $\tau_0$ with the product of the determined factor, $\alpha$, and the rate of change $d(\tau_{dd})/dt$ to produce the control signal, $\tau$.

4. The method recited in claim 3 where $\alpha$ is $1+f(\Delta\tau)$ when the sense of the determined time rate of change $d(\tau_{dd})/dt$ is positive and where $\alpha$ is $1-f(\Delta\tau)$ when the sense of the determined time rate of change $d(\tau_{dd})/dt$ is negative and where:

$$f(\Delta\tau) = -M, \text{ when } (\Delta\tau) < -B$$
$$= +M \text{ when } (\Delta\tau) > +B; \text{ and}$$
$$= (M/B)(\Delta\tau) \text{ when } -B > (\Delta\tau) > +B;$$

where M and B are constants and the magnitude of M is less than or equal to 1 and B is >0.

5. A computer readable storage media having stored therein data representing instructions executable by a computer to control an electronically controlled throttle of an internal combustion engine, the storage media comprising:
   instructions for periodically determining driver demanded torque, $\tau_{dd}$;
   instructions for determining, from said determined driver demanded torque, the time rate of change $d(\tau_{dd})/dt$ in such determined driver demanded torque; providing a control signal, $\tau$, to the electronically controlled throttle, such provided control signal being a function of: a previously provided control signal to the electronically controlled throttle, $\tau_0$; an offset, $\Delta\tau$, of the previously provided control signal, $\tau_0$, from the determined driver demanded torque, $\tau_{dd}-\tau_0$; and the determined time rate of change $d(\tau_{dd})/dt$); and
   instructions for providing a control signal, $\tau$, to the electronically controlled throttle.

6. The media recited in claim 5 wherein the instructions for providing the control signal, $\tau$, providing comprises:
   instructions for determining a factor, $\alpha$, such factor being a function of the offset $\Delta\tau$, and the sense of the determined time rate of change $d(\tau_{dd})/dt$; and
   instructions for summing the previously provided control signal, $\tau_0$ with the product of the determined factor, $\alpha$, rate of change $d(\tau_{dd})/dt$ to produce the control signal, $\tau$.

7. A system for controlling an internal combustion engine, comprising:
   electronically controlled throttle for controlling airflow to cylinders of such engine;
   a system for determining driver demanded torque, $\tau_{dd}$; and
   a processor for determining, from said determined driver demanded torque, the time rate of change $d(\tau_{dd})/dt$ in such determined driver demanded torque; providing a control signal, $\tau$, to the electronically controlled throttle, such provided control signal being a function of: a previously provided control signal to the electronically controlled throttle, $\tau_0$; an offset, $\Delta\tau$, of the previously provided control signal, $\tau_0$, from the determined driver demanded torque, $\tau_{dd}-\tau_0$; and the determined time rate of change $d(\tau_{dd})/dt$).

8. The system recited in claim 7 wherein the control signal, $\tau$, providing comprises:
   combining driver demanded torque $\tau_{dd}$ with a term $\tau'$, the term $\tau'$ being:
   (A) relatively small when:
      (a) the sense of the determined time rate of change $d(\tau_{dd})/dt$ is positive; and
      (b) the control signal, $\tau$, is greater than the determined driver demanded torque $\tau_{dd}$;
   (B) relatively small when:
      (a) the sense of the determined time rate of change $d(\tau_{dd})/dt$ is negative; and
      (b) the control signal, $\tau$, is less than the determined driver demanded torque $\tau_{dd}$;
   (C) relatively large when:
      (a) the sense of the determined time rate of change $d(\tau_{dd})/dt$ is positive; and
      (b) the control signal, $\tau$, is greater than the determined driver demanded torque $\tau_{dd}$; and
   (D) relatively large when:
      (a) the sense of the determined time rate of change $d(\tau_{dd})/dt$ is negative; and
      (b) the control signal, $\tau$, is greater than the determined driver demanded torque $\tau_{dd}$.

9. The system recited in claim 7 wherein the processor providing the control signal, $\tau$:
   determines a factor, $\alpha$, such factor being a function the offset, $\Delta\tau$, and the sense of the determined time rate of change $d(\tau_{dd})/dt$; and
   sums the previously provided control signal, $\tau_0$ with the product of the determined factor, $\alpha$, and the rate of change $d(\tau_{dd})/dt$ to produce the control signal, $\tau$.

10. The system recited in claim 9 where $\alpha$ is $1+f(\Delta\tau)$ when the sense of the determined time rate of change $d(\tau_{dd})/dt$ is positive and where $\alpha$ is $1-f(\Delta\tau)$ when the sense of the determined time rate of change $d(\tau_{dd})/dt$ is negative and where:

$$f(\Delta\tau) = -M, \text{ when } (\Delta\tau) < -B$$
$$= +M \text{ when } (\Delta\tau) > +B; \text{ and}$$
$$= (M/B)(\Delta\tau) \text{ when } -B > (\Delta\tau) > +B;$$

where M and B are constants and the magnitude of M is less than or equal to 1 and B is >0.

* * * * *